US011547035B1

(12) United States Patent
Boe et al.

(10) Patent No.: US 11,547,035 B1
(45) Date of Patent: Jan. 10, 2023

(54) LIFT ASSIST FOR AN ELECTRICALLY DRIVEN HITCH ON AN ROBOTIC VEHICLE

(71) Applicant: Amos Power, Inc., Cedar Falls, IA (US)

(72) Inventors: Thomas Cedric Boe, Cedar Falls, IA (US); Zachary Kooistra, Cedar Falls, IA (US); Forrest Beeler, West Des Moines, IA (US); Louis Macuch, Waynesboro, GA (US); Broc Ducharme, Harlem, GA (US); Kyle Laurence Boe, Cedar Falls, IA (US); Isiah Brandt, Cedar Falls, IA (US)

(73) Assignee: AMOS POWER, INC., Cedar Falls, IA (US)

( * ) Notice: Subject to any disclaimer, the term of this patent is extended or adjusted under 35 U.S.C. 154(b) by 0 days.

(21) Appl. No.: 17/752,237

(22) Filed: May 24, 2022

(51) Int. Cl.
*A01B 59/06* (2006.01)
*A01B 63/12* (2006.01)
*A01B 69/04* (2006.01)

(52) U.S. Cl.
CPC ............ *A01B 59/068* (2013.01); *A01B 63/12* (2013.01); *A01B 69/008* (2013.01)

(58) Field of Classification Search
CPC ... A01B 59/068; A01B 59/066; A01B 69/008; A01B 63/12; A01B 63/00; A01B 63/002; A01B 63/02
See application file for complete search history.

(56) References Cited

U.S. PATENT DOCUMENTS

| | | | | |
|---|---|---|---|---|
| 2,724,313 A | * | 11/1955 | Jennings | A01B 5/14 172/222 |
| 3,753,467 A | * | 8/1973 | Wilson | A01B 63/22 172/3 |
| 3,817,557 A | * | 6/1974 | Manor | A01B 61/02 280/452 |
| 4,060,310 A | | 11/1977 | Brown | |
| 4,108,248 A | * | 8/1978 | Mueller, Jr. | A01B 63/1117 172/9 |
| 4,326,549 A | | 4/1982 | Hinding | |
| 4,379,673 A | * | 4/1983 | Takahashi | A01B 59/048 180/53.3 |

(Continued)

FOREIGN PATENT DOCUMENTS

| | | |
|---|---|---|
| CN | 109398516 | 3/2019 |
| WO | 2008073990 | 6/2008 |

(Continued)

OTHER PUBLICATIONS www.ztractor.com—Print screen dated Nov. 15, 2021, Ztractor, Palo Alto, CA.

(Continued)

*Primary Examiner* — Jamie L McGowan
(74) *Attorney, Agent, or Firm* — Shuttleworth & Ingersoll, PLC; Jason R. Sytsma

(57) ABSTRACT

A spring is combined between the chassis and the pair of links arms. An electric actuator is combined between the chassis and the pair of links arms for compressing the spring with the assistance of gravity on a downward stroke of the electric actuator while lowering the pair of link arms, and wherein the pair of link arms are raised by an outward stroke of both the electric actuator and the spring.

21 Claims, 5 Drawing Sheets

(56) References Cited

U.S. PATENT DOCUMENTS

| | | | |
|---|---|---|---|
| 4,431,207 A * | 2/1984 | Langenfeld | B60D 1/025 |
| | | | 280/416.2 |
| 4,541,051 A | 9/1985 | Jarret | |
| 4,858,698 A * | 8/1989 | Williamson | A01B 63/1145 |
| | | | 172/677 |
| 4,873,475 A | 10/1989 | Togo | |
| 5,035,158 A | 7/1991 | Leigh-Monstevens | |
| 5,101,922 A | 4/1992 | Ohmura | |
| 5,169,279 A * | 12/1992 | Zimmerman | B66F 9/18 |
| | | | 280/416.2 |
| 5,301,765 A | 4/1994 | Swanson | |
| 5,360,307 A | 11/1994 | Schemm | |
| 5,365,283 A | 11/1994 | Doherty | |
| 5,456,333 A | 10/1995 | Brandt | |
| 5,492,192 A | 2/1996 | Brooks | |
| 5,529,028 A | 6/1996 | Weikert | |
| 5,538,264 A * | 7/1996 | Brown | B60G 9/00 |
| | | | 280/503 |
| 5,652,487 A | 7/1997 | Nishino | |
| 5,657,099 A | 8/1997 | Gordon | |
| 5,697,454 A | 12/1997 | Wilcox | |
| 5,751,579 A | 5/1998 | Hrovat | |
| 5,761,890 A * | 6/1998 | Lehman | A01D 75/20 |
| | | | 56/13.6 |
| 5,782,071 A * | 7/1998 | Lehman | A01D 34/661 |
| | | | 56/6 |
| 5,951,115 A | 9/1999 | Sakai | |
| 6,108,193 A | 8/2000 | Haberstroh | |
| 6,119,802 A | 9/2000 | Puett | |
| 6,154,702 A | 11/2000 | Fodor | |
| 6,178,669 B1 * | 1/2001 | Quenzi | E01H 5/06 |
| | | | 37/234 |
| 6,219,607 B1 | 4/2001 | Piepenbrink | |
| 6,250,409 B1 | 6/2001 | Wells | |
| 6,257,347 B1 * | 7/2001 | Campisi | A01B 59/068 |
| | | | 172/439 |
| 6,298,941 B1 | 10/2001 | Spadafora | |
| 6,305,506 B1 | 10/2001 | Shirai | |
| 6,405,806 B1 * | 6/2002 | Bernhardt | A01B 59/068 |
| | | | 172/272 |
| 6,577,025 B2 | 6/2003 | Hentschel | |
| 6,717,281 B1 | 4/2004 | Brandon | |
| 6,727,669 B2 | 4/2004 | Suzuki | |
| 6,764,270 B1 * | 7/2004 | Bernhardt | A01B 59/068 |
| | | | 414/718 |
| 6,874,592 B2 | 4/2005 | Yokotani | |
| 6,935,434 B1 * | 8/2005 | Easton | A01B 63/00 |
| | | | 172/7 |
| 6,978,856 B2 | 12/2005 | Nakamura | |
| 7,032,981 B2 | 4/2006 | Frey | |
| 7,104,364 B2 | 9/2006 | Godlewsky | |
| 7,185,745 B2 | 3/2007 | Godlewsky | |
| 7,201,384 B2 | 4/2007 | Chaney | |
| 7,347,803 B2 | 3/2008 | Kobayashi | |
| 7,351,182 B2 | 4/2008 | Kobayashi | |
| 7,784,558 B2 | 8/2010 | Mozingo | |
| 7,828,071 B2 * | 11/2010 | Breneur | A01B 59/069 |
| | | | 172/311 |
| 7,828,099 B2 | 11/2010 | Heckeroth | |
| 7,861,794 B2 * | 1/2011 | Tarasinski | A01B 59/068 |
| | | | 172/439 |
| 7,902,987 B2 | 3/2011 | Lemasson | |
| 7,950,481 B2 | 5/2011 | Betz | |
| 7,954,960 B2 | 6/2011 | Shirai | |
| 8,083,245 B2 | 12/2011 | Hatzikakidis | |
| 8,193,650 B2 | 6/2012 | Thorne | |
| 8,197,077 B2 | 6/2012 | Brouwer | |
| 8,246,120 B2 | 8/2012 | Bourqui | |
| 8,288,979 B2 | 10/2012 | Bates | |
| 8,327,960 B2 | 12/2012 | Couture | |
| 8,413,752 B2 | 4/2013 | Page | |
| 8,466,578 B2 | 6/2013 | Ackert | |
| 8,467,929 B2 | 6/2013 | Bechtler | |
| 8,494,699 B2 | 7/2013 | Bourqui | |
| 8,500,289 B2 | 8/2013 | Shibasaki | |
| 8,657,058 B2 | 2/2014 | Bolz | |
| 8,684,115 B2 | 4/2014 | Bryant | |
| 8,714,292 B1 | 5/2014 | Wong | |
| 8,717,156 B2 | 5/2014 | Tronnier | |
| 9,061,592 B2 | 6/2015 | Meng | |
| 9,061,680 B2 | 6/2015 | Dalum | |
| 9,085,302 B2 | 7/2015 | Borroni-Bird | |
| 9,199,609 B2 | 12/2015 | Rasal | |
| 9,221,451 B2 | 12/2015 | Ahn | |
| 9,232,687 B2 | 1/2016 | Bassett | |
| 9,302,667 B2 | 4/2016 | Tassinger | |
| 9,308,964 B2 | 4/2016 | Saida | |
| 9,481,263 B2 | 11/2016 | Ebert | |
| 9,561,767 B2 | 2/2017 | Darraba | |
| 9,561,779 B2 | 2/2017 | Rasal | |
| 9,615,497 B2 | 4/2017 | Bassett | |
| 9,711,767 B2 | 7/2017 | Juenger | |
| 9,947,148 B2 | 4/2018 | Moellmann | |
| 10,029,571 B2 | 7/2018 | Ito | |
| 10,093,308 B2 | 10/2018 | Sugai | |
| 10,104,824 B2 | 10/2018 | Blackwell | |
| 10,112,471 B2 | 10/2018 | Higuchi | |
| 10,259,498 B2 | 4/2019 | Jagenstedt | |
| 10,322,769 B2 | 6/2019 | Tanaka | |
| 10,379,532 B2 | 8/2019 | Cameron | |
| 10,458,402 B2 | 10/2019 | Yan | |
| 10,466,699 B2 | 11/2019 | Hirata | |
| 10,562,381 B2 | 2/2020 | Haubs | |
| 10,562,400 B2 | 2/2020 | Ryu | |
| 10,589,738 B1 | 3/2020 | Boecker | |
| 10,659,707 B2 | 5/2020 | Oka | |
| 10,734,878 B2 | 8/2020 | Kim | |
| 10,788,043 B2 | 9/2020 | He | |
| 10,793,084 B2 | 10/2020 | Jiang | |
| 10,814,889 B2 | 10/2020 | Looney | |
| 10,858,041 B2 | 12/2020 | Jagenstedt | |
| 10,889,341 B2 | 1/2021 | Warr | |
| 10,893,645 B2 | 1/2021 | Heckeroth | |
| 10,946,856 B2 | 3/2021 | Oyama | |
| 10,980,173 B2 | 4/2021 | Becke | |
| 11,021,158 B2 | 6/2021 | Mueller | |
| 2001/0047600 A1 * | 12/2001 | Quenzi | E01H 5/06 |
| | | | 37/234 |
| 2004/0188112 A1 * | 9/2004 | Deves | B62D 49/02 |
| | | | 172/439 |
| 2004/0188114 A1 * | 9/2004 | Schlesser | A01B 63/1006 |
| | | | 172/439 |
| 2005/0028993 A1 * | 2/2005 | Potter | A01B 59/068 |
| | | | 172/439 |
| 2007/0012496 A1 | 1/2007 | Chene | |
| 2007/0029117 A1 | 2/2007 | Goldenberg | |
| 2008/0035356 A1 * | 2/2008 | Dahl | B60K 11/04 |
| | | | 172/439 |
| 2008/0169109 A1 * | 7/2008 | Buhrke | A01B 59/068 |
| | | | 172/47 |
| 2009/0200051 A1 * | 8/2009 | Tarasinski | A01B 59/068 |
| | | | 172/439 |
| 2009/0295222 A1 | 12/2009 | Scheetz | |
| 2011/0005847 A1 | 1/2011 | Andrus | |
| 2011/0147020 A1 * | 6/2011 | Waltz | A01B 59/066 |
| | | | 172/439 |
| 2014/0048344 A1 | 2/2014 | Canfield | |
| 2015/0105965 A1 | 4/2015 | Blackwell | |
| 2016/0096548 A1 | 4/2016 | Tigue | |
| 2016/0334801 A1 | 11/2016 | Ratanaphanyarat | |
| 2017/0086346 A1 * | 3/2017 | Payne | B60D 1/025 |
| 2017/0100974 A1 * | 4/2017 | Smith | A01B 59/068 |
| 2017/0290258 A1 * | 10/2017 | Mollick | A01B 63/023 |
| 2019/0281755 A1 * | 9/2019 | Heckeroth | A01B 59/067 |
| 2020/0000002 A1 * | 1/2020 | Chrysanthakopoulos | |
| | | | A01B 69/008 |
| 2020/0031408 A1 | 1/2020 | DiBiase | |
| 2021/0223772 A1 | 7/2021 | Penmetsa | |

(56) References Cited

U.S. PATENT DOCUMENTS

FOREIGN PATENT DOCUMENTS

| WO | 2020106142 | 5/2020 |
| --- | --- | --- |
| WO | 2020106143 | 5/2020 |
| WO | 2020152123 | 7/2020 |
| WO | 2021146478 | 7/2021 |
| WO | 2021146493 | 7/2021 |
| WO | 2021146510 | 7/2021 |

OTHER PUBLICATIONS www.AgXeed.com—Print screen dated Nov. 15, 2021, AgXeed, Oirlo, The Netherlands.
https://www.monarchtractor.com/mkv.html—Print screen dated Nov. 15, 2021, Zimeno Inc dba Monarch Tractor, Livermore, CA.
https://i.ytimg.com/vi/qcYR2XaD0UA/maxresdefault.jpg—photo of AgXeed tractor.
ISO 730 Agricultural wheeled tractors—Rear-mounted three-point linkage—Categories 1N, 1, 2N, 3N, 3, 4N and 4, First Edition Jan. 15, 2009.

\* cited by examiner

LIFT ASSIST FOR AN ELECTRICALLY DRIVEN HITCH ON AN ROBOTIC VEHICLE

TECHNICAL FIELD

This disclosure relates to a hitch for a vehicle, and more specifically, this disclosure relates to a lift assist for an electrically driven hitch assembly.

BACKGROUND INFORMATION

Three point linkage (or three-point-hitch) is a standard system to attach implements to tractors. Such hitches comprise three movable arms assembled in a triangle formation. The lower lift arms are two rigid bars typically with ball joints at each end. The top link is rigid arm that sets the operating angle alignment of the implement. This type of hitch can be modified with a second top link to form a four-bar linkage. The operation of these hitches are similar.

Advances in robotics, automation, and battery technology has allowed for the development of robotic farm vehicles. While these vehicles are battery operated, the batteries power hydraulic systems to drive the hydraulic actuators necessary for lifting heavy loads on the hitches. An electrical actuator could be powered directly by the battery without the added weight and expense of a hydraulic system. Electrical actuators, however, lack the load capacity and ability to work under heavy pressures, which is critical in farming operations.

Accordingly, there is a need for an improvement to an electrically driven hitch assembly.

SUMMARY

In accordance with one aspect of the present invention, disclosed is a hitch assembly combinable to a chassis of a vehicle for selectively receiving an implement. The hitch assembly comprises a pair of link arms combined to the chassis for selectively receiving the implement. At least one center link is combined to the chassis and spaced vertically from the pair of lift arms for selectively receiving the implement. The pair of link arms and the center link form attachment points for the implement. A spring is combined between the chassis and the pair of links arms. An electric actuator is combined between the chassis and the pair of links arms for compressing the spring with the assistance of gravity on a downward stroke of the electric actuator while lowering the pair of link arms, and wherein the pair of link arms are raised by an outward stroke of both the electric actuator and the spring.

In an embodiment, a rockshaft extends parallel with respect to a longitudinal length of the chassis. A bracket is fixed to the rockshaft, wherein the center link is rotatably attached to the bracket. A pair of lift arms can be spaced apart from each other on opposite sides of the center link and each fixed to the rockshaft at one end and pivotally attached to the electric actuator and the spring at the other end. A pair of rocker arms can be spaced apart from each other on opposite sides of the center link and each fixed to the rockshaft at opposite ends. A pair of lift rods can be provided each one of which being attached to a corresponding one of the pair of lower link arms at one end and to the corresponding one of the pair of rocker arms at the other end.

In an embodiment, the electric actuator comprises of a housing and a rod that extends and retracts with respect to the housing. The housing can be pivotally mounted to the chassis and the rod is pivotally attached to one of the pair of lift arms. A pair of electric actuators can be provided with each one of which pivotally attached to one of the corresponding pair of lift arms. A pair of springs can be provided with each one of which attached to one of the corresponding pair of lift arms. In an embodiment, the pair of springs are each gas springs comprising a cylinder and a piston rod linearly extending and retracting with respect thereto. The cylinder of each of the gas springs can be pivotally mounted to the chassis at one end and the piston rod can be pivotally mounted to one of the lift arms of the pair of lift arms at the other end. A pair of mounting brackets can be provided with each one of which is fixed on an opposite side of the chassis, wherein the cylinder of each of the gas springs can be pivotally mounted to one of the pair of mounting brackets, and wherein the housing of each of the electric actuators can be pivotally mounted to one of the pair of mounting brackets. A rotational axis of the housing of the electric actuator can be above a rotational axis of the cylinder of the gas spring.

In an embodiment, the rotational axis of the housing of the electric actuator is positioned rearward of the rotational axis of the cylinder of the gas spring. The rotational axis of the housing of the electric actuator can be positioned above a rotational axis of a link arm of the pair of link arms. In an embodiment, a vertical plane defined by the rotational axis of the housing of the electric actuator can be forward with respect to a vertical plane defined by a rotational axis of the rockshaft.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
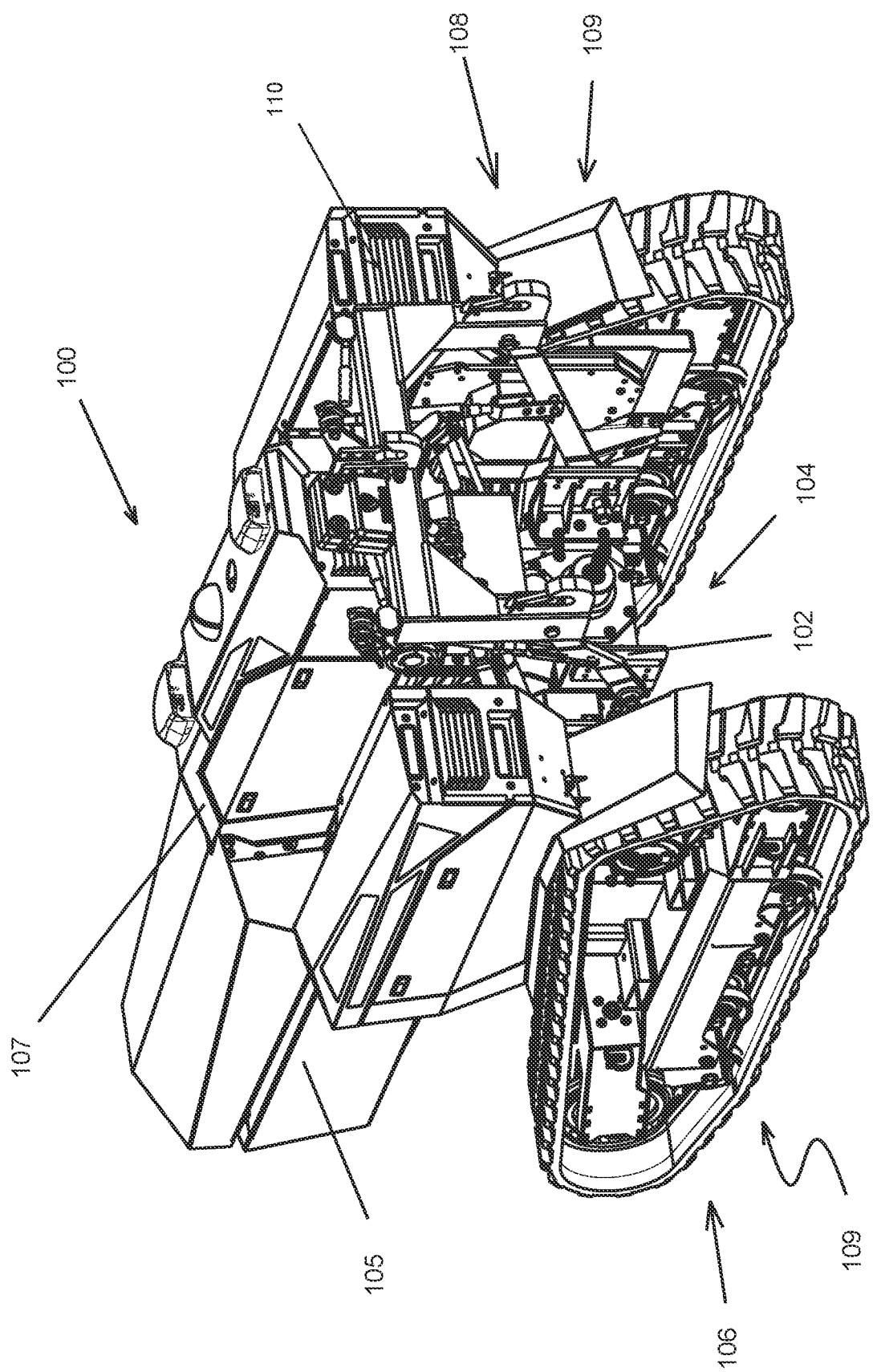
FIG. 1 is a rear perspective view of a robotic vehicle with an electrically driven hitch assembly according to this disclosure.
Figure 2:
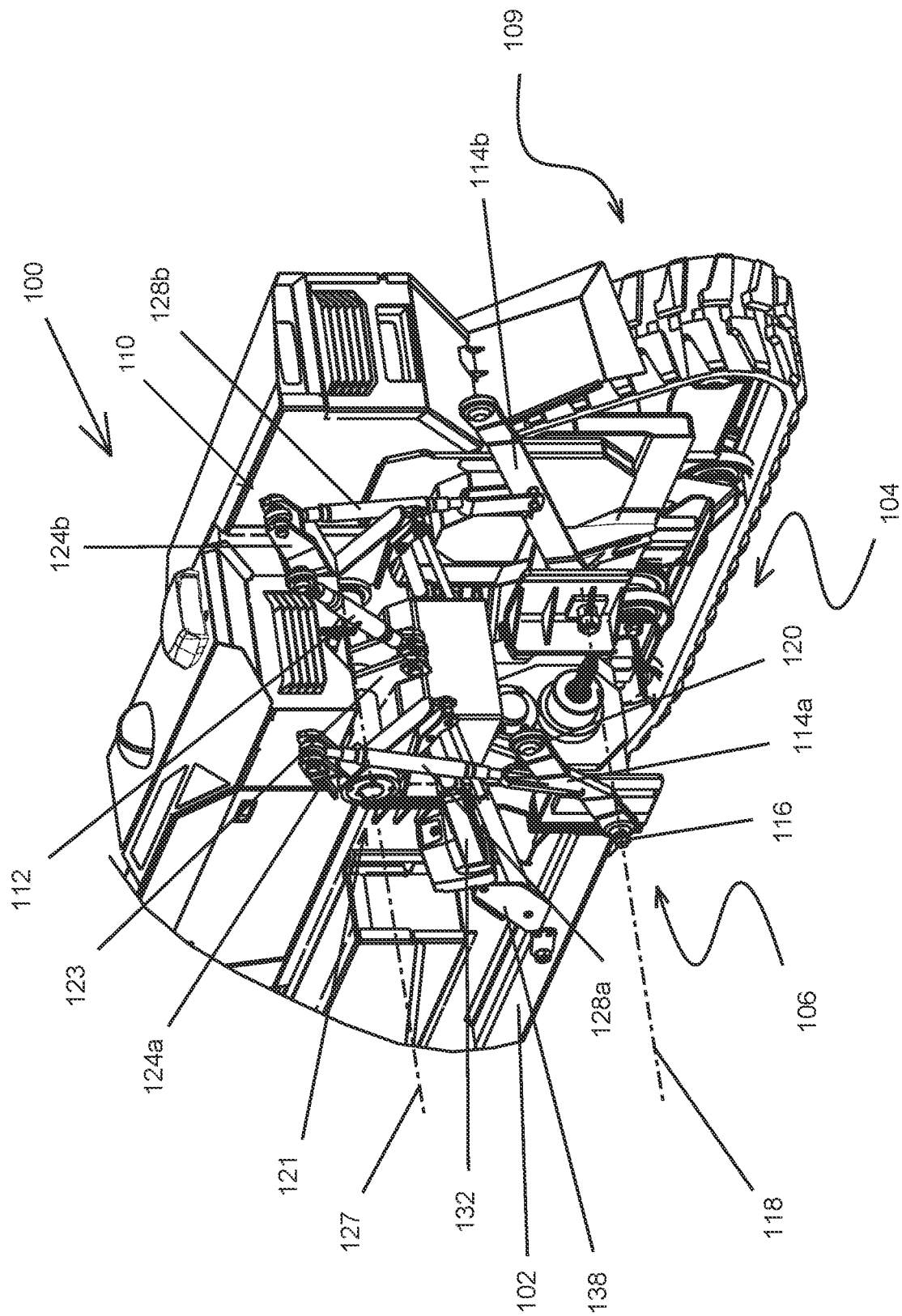
FIG. 2 is the rear perspective view of the robotic vehicle of FIG. 1 with the left motor drive and track assembly removed for clarity.

FIGS. 1 and 2 show a rear-end perspective view of a robotic vehicle 100 with a hitch assembly 110 adapted for adjustably coupling a load, preferably an implement. Robotic vehicle 100 comprises of a chassis 102 extending in a longitudinal direction between a front end (not depicted) and a rear end 104 and transversely between a first or left lateral side 106 and an opposing second or right lateral side 108. Chassis 102 generally supports mounting for left and right track assemblies 109 or axle assemblies for wheels in a conventional manner. Chassis 102 also supports a control unit 107 and a battery unit 105 necessary for robotic vehicle 100. Robotic vehicle 100 can also support a hitch assembly 110 on the front end.

Turning to FIG. 2, depicts rear mounted, hitch assembly 110. Hitch assembly 110 comprises of a center link 112 above a pair of link arms 114 comprising a first link arm 114*a* and a second link arm 114*b*. First link arm 114*a* and second link arm 114 are positioned parallel to each other on opposite lateral sides of chassis 102. Center link 112 can be above first link arm 114*a* and second link arm 114*b*, as illustrated, or below first link arm 114*a* and second link arm 114*b*. There can also be a center link 112 above each first link arm 114*a* and second link arm 114*b* to for a four-bar lift mechanism. Each of first link arm 114*a* and second link arm 114*b* are configured at their first longitudinal ends 116 for pivotal connection with chassis 102 of robotic vehicle 100 to rotate about a common axis 118, which extends horizontally and transversely between left lateral side 106 and right lateral side 108. Each of first link arm 114*a* and second link arm 114*b* extend rearward from axis 118 and include second longitudinal ends 120 configured for pivotal connection with the implement or load.

A rocker assembly 121 comprises of a rockshaft 122 extending transversely across rear end 104 of robotic vehicle 100. Rockshaft 122 oscillates about its bearings about an axis 127, but does not revolve. At least one bracket 123 is fixed near the center of rock shaft 122 with center link 112 pivotally attached to the other end of bracket 123. In the illustrated embodiment, a pair of brackets 123 are fixed near the center of rock shaft 122 with center link 112 pivotally constrained between pair of brackets 123. Attached to rockshaft 122 on opposite lateral sides are a pair of rocker arms 124 (124*a*, 124*b*) and a pair of lift arms 126 (126*a*, 126*b*) each of which rotate with rockshaft 122 about axis 127.

Extending between corresponding rocker arms 124*a*, 124*b* and link arms 114*a*, 114*b* are lift rods 128. Lift rods 128 have each of their respective ends pivotally attached between a corresponding one of lift rods 128 and a corresponding one of first link arm 114*a* and second link arm 114*b*. These lift rods 128 are adjustable in length to level hitch assembly 110 from left to right. In this respect, rocker assembly 121 combines center link 112 to first link arm 114*a* and second link arm 114*b*.

Each of lift arms 126 are fixed at one longitudinal end to rockshaft 122 and pivotally attached at the other end to an electric actuator 130 and a spring 140. Lift arms 126 are raised and lowered by electric actuator 130. Electric actuator 132 can be pivotally attached to chassis 102 at one end and pivotally attached to lift arms 126 at the other end. In the illustrated embodiment, electric actuator 132 comprises a cylinder 134 and a piston 136 that moves linearly, in and out, with respect to cylinder 134. Cylinder 134 can be pivotally combined to chassis 102, either directly or indirectly by a bracket 138. One end of piston 136 is coupled inside cylinder 134 and the other end of piston 136 can be pivotally combined to one of lift arms 126*a*, 126*b*. It should be understood that electric actuator 132 can be reversed with piston 136 attached to chassis 102 and cylinder 134 attached to one of lift arms 126*a*, 126*b*. In the illustrated embodiment, a pair of electric actuators 132 are provided corresponding with pair of lift arms 126.

The operation of electric actuator 132 is powered with electrical power either directly from battery unit 105 or control unit 107 to supply a DC power source to the motor, which in combination with gear converts rotational motion of the output shaft of the motor to linear movement of piston 136. A control signal from control unit 107 to the motor control of electrical actuator 132 controls the stroke speed and distance of piston 136. A distinguishing characteristic of electric actuator 132 over other types of actuators is its positive cw and ccw rotation of the output shaft of the motor translates to positive inward and outward stroke of piston 136 which means the same force from the motor to extend piston 136 can be used to retract piston 136. In this regard, electric actuator 132 is a double acting, electric actuator 132.

A spring 140 is attached in parallel with electric actuator 132 between chassis 102 and one of lift arms 126*a*, 12*b*. Spring 140 is compressed with the force of both gravity and a positive inward stroke of piston 136 of electrical actuator 132. The stored potential energy of spring 140 is released simultaneously with the outward stroke of piston 136 to double the lifting power. In this way, electrical actuator 132 can be half the size required for lifting the implement. Spring 140 can be any type of mechanical spring for storing energy in the form of an elastic or resilient member that deflects under the action of load and returns to its normal shape when the load is removed (e.g. a helical spring, torsion spring, compression spring, elastomeric-material, etc.), or a gas spring that uses compressed gas within an enclosed cylinder 142 sealed by a sliding piston 144 to pneumatically store energy. Spring 140 can be attached pivotally to bracket 138 at one end and attached pivotally to one of lift arms 126 at the other end. In the illustrated embodiment cylinder 142 is attached to chassis 102 and piston is attached to one of lift arms 126, although the reverse arrangement is contemplated.

Hitch assembly 110 can be adjusted front to back or tilted by adjusting center link 112. Center link 112 can be implemented with a rod in a cylinder which rod is telescopically adjustable with respect to the cylinder. In this regard, center link 112 can be a cylinder that is manually adjustable, or an electric actuator similar to that described in the context of electrical actuator 132.

Figure 5:
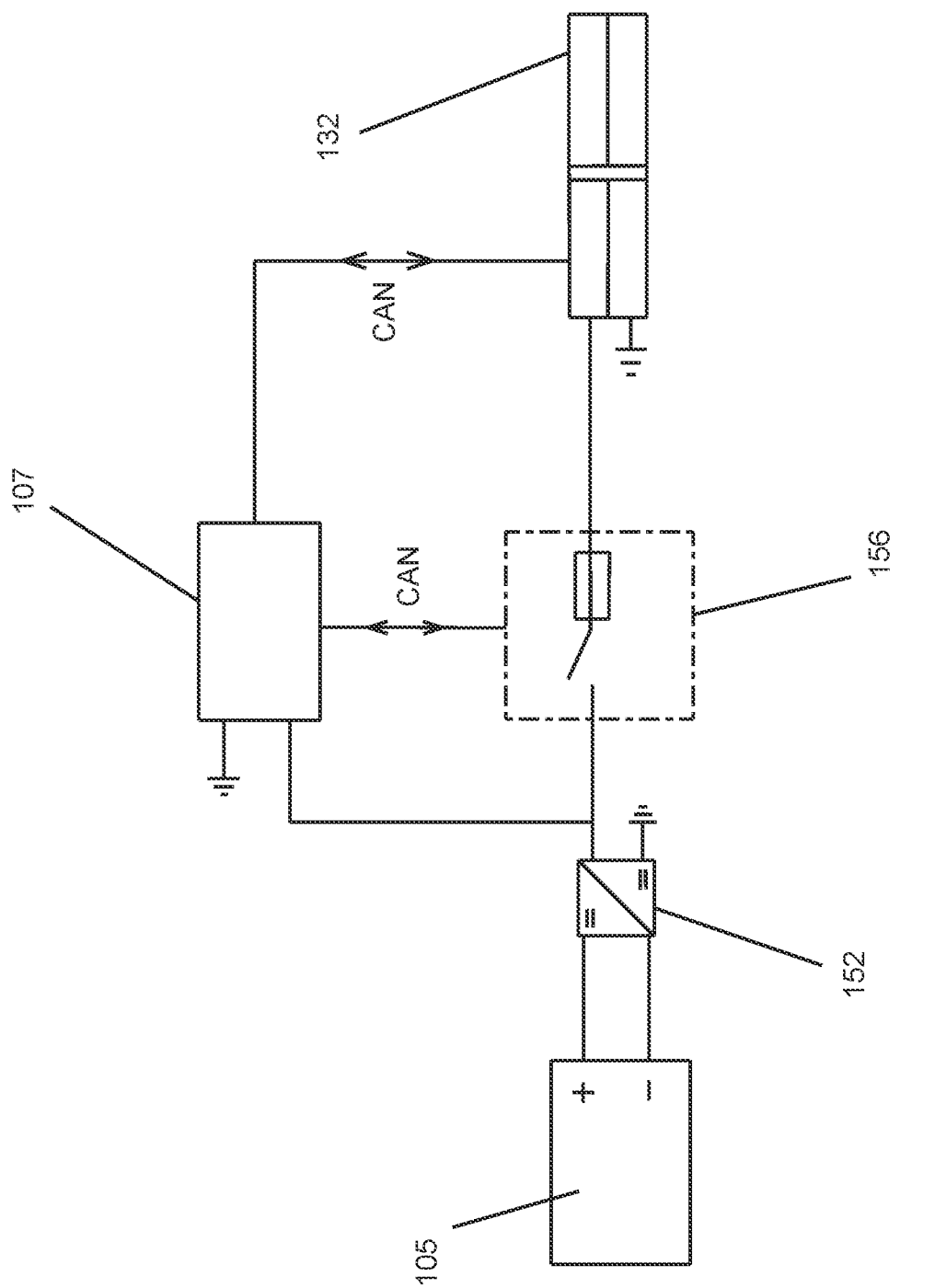
FIG. 5 is an electrical schematic for an electrical actuator illustrated in FIG. 1.

FIG. 5 shows FIG. 5 an electrical schematic for electrical actuator 132. Power is provided as a DC voltage from battery unit 105. A DC/DC converter 154 converts the DC source voltage from battery unit 105 to a lower voltage, preferably a 12V dc voltage to supply power to both control unit 107 and electrical actuator 132. Control unit 107 can be implemented in a controller area network (CAN), which connects the various micro-controllers and computer systems of robotic vehicle 100 together. Specifically, control unit 107 is connected to a control channel of electric actuator 132 to send and receive a position signal for electric actuator 132. This allows control unit 107 to precisely control the extension and retraction of electric actuator 132. A fuse 156 can be positioned between DC/DC converter 154 and electric actuator 132 to protect against a current overload. This fuse 156 can have a communication channel connected to control unit 107 to inform control unit 107 of a break in the circuit.

Figure 4:
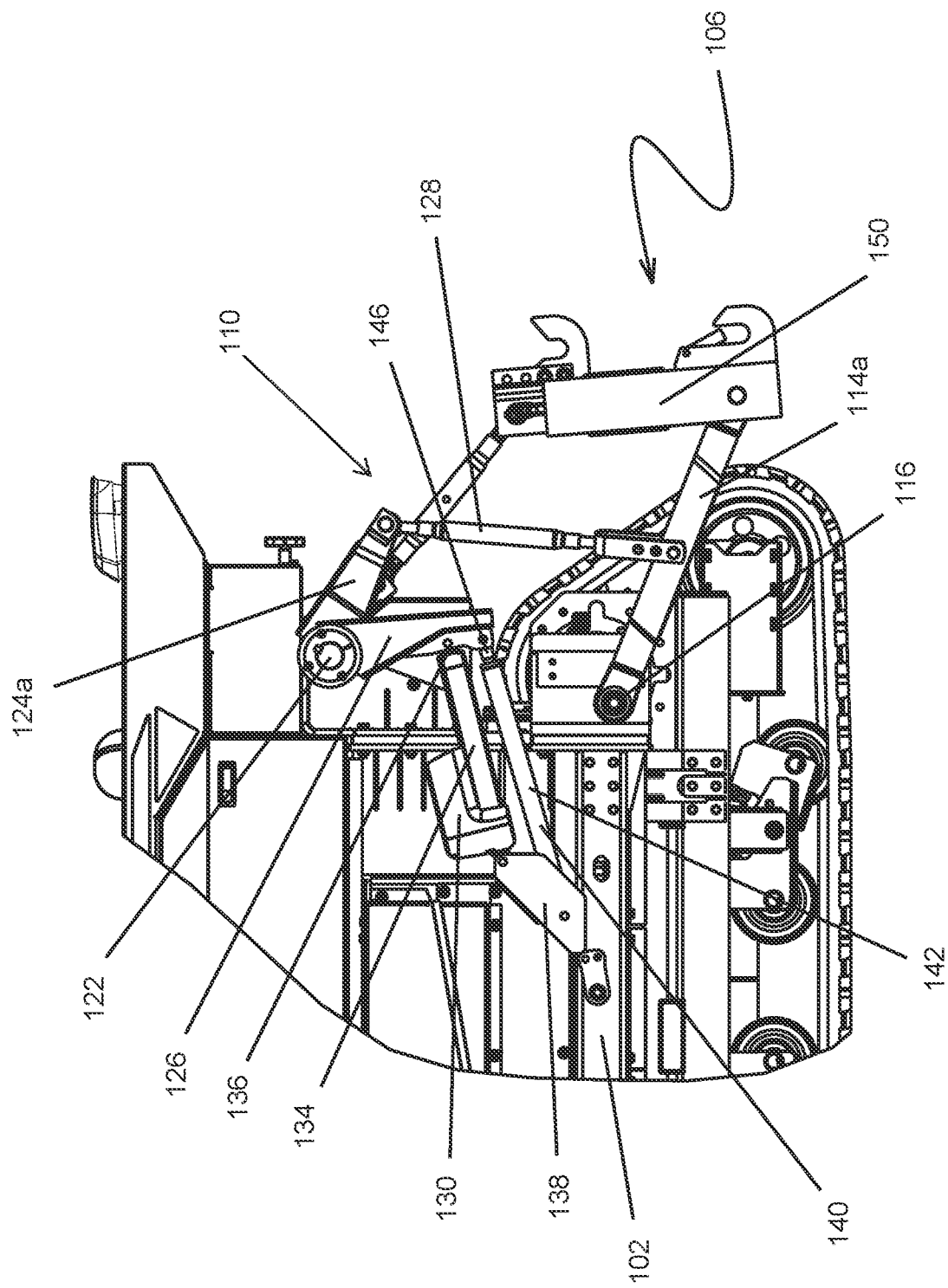
FIG. 4 is a side view of the robotic vehicle shown in FIG. 2 with the hitch assembly in the lowered position.

In operation, beginning from the lowered position of hitch assembly 110, as shown in FIG. 4, electrical actuator 132 has its piston 136 retracted in its cylinder 134 and spring 140 is compressed. When it is time to raise hitch assembly 110, a control signal from control unit 107 commands electrical actuator 132 to extend piston 136, the positive extension of piston 136 and the stored energy released from spring 140 raises hitch assembly 110 by powering lift arms 126 to rotate ccw about rockshaft 122 which in turn rotates ccw center link 112 and rocker arms 124, which in turn raises first link arm 114*a* and second link arm 114*b*. Implement 150 attached to center link 112 and first link arm 114*a* and second link arm 114*b* will also raise.

Figure 3:
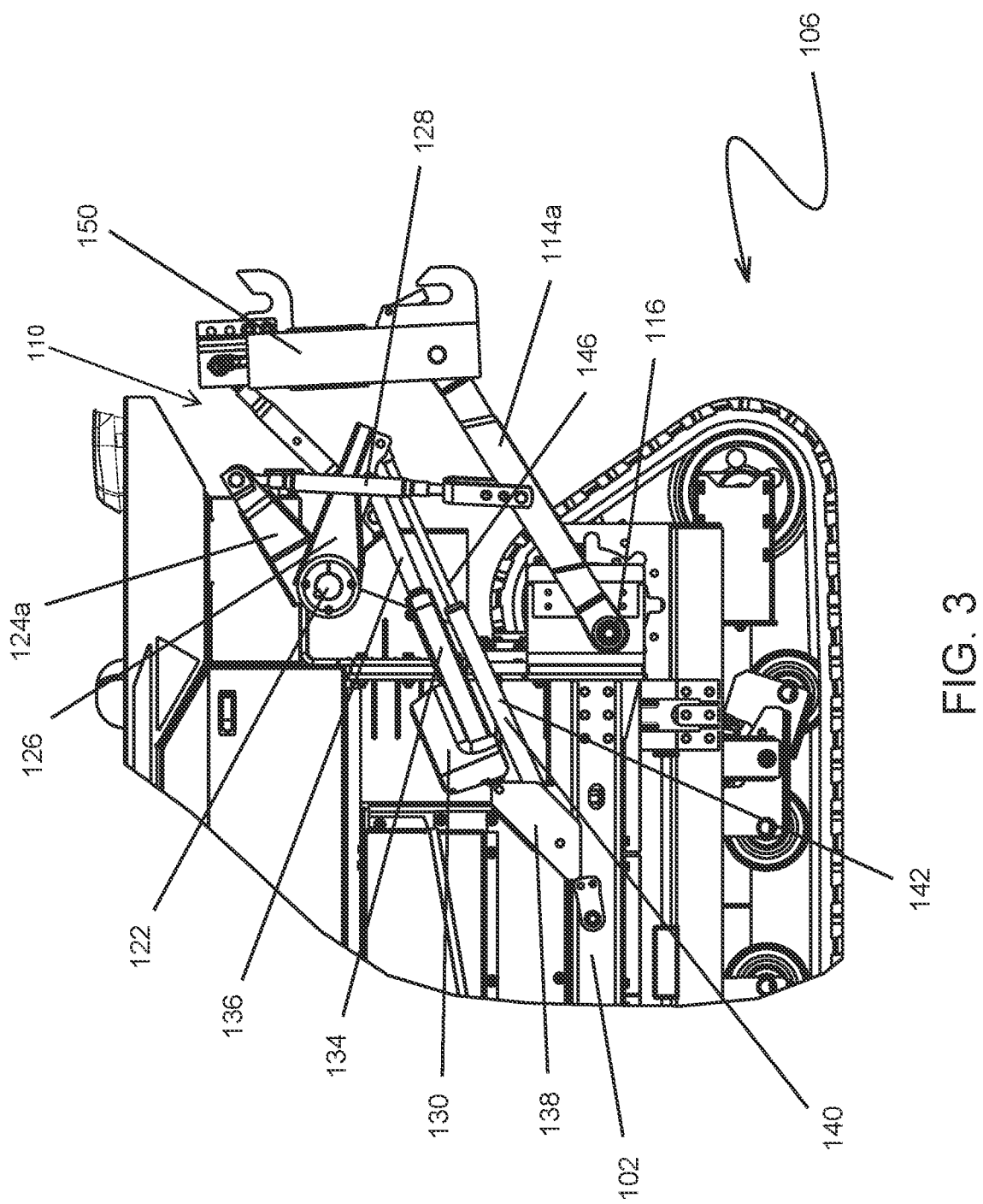
FIG. 3 is a side view of the robotic vehicle shown in FIG. 2 with the hitch assembly in the raised position.

Beginning with the raised position, as shown in FIG. 3, to lower hitch assembly 110, a control signal from control unit 107 commands electrical actuator 132 to retract piston 136, the positive retraction of piston 136 and gravity compresses spring 140 by rotating lift arms 126 cw about rockshaft 122, which in turn rotates cw center link 112 and rocker arms 124, which in turn lowers first link arm 114*a* and second link arm 114b. Implement 150 attached to center link 112 and first link arm 114a and second link arm 114b will also lower.

Implement 150 can be a quick hitch with three attachment points, also known as a 3-point hitch, that provides attachment points for any type of additional implement. Implement 150 can also be any type of tooling usable for doing work, such as those known to those skilled in the art, including, without limitation, scrapers, sprayers, plows, scoops, drawbars, etc.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A hitch assembly combinable to a chassis of a vehicle for selectively receiving an implement, the hitch assembly comprising:
   a pair of link arms combined to the chassis for selectively receiving the implement;
   a center link combined to the chassis and spaced vertically from the pair of link arms for selectively receiving the implement, wherein the pair of link arms and the center link form attachment points for the implement;
   a spring combined between the chassis and the pair of links arms; and
   an electric actuator combined between the chassis and the pair of links arms for compressing the spring with the assistance of gravity on a downward stroke of the electric actuator while lowering the pair of link arms to store potential energy in the spring and match the lifting power of an outward stroke of the electric actuator when the pair of link arms are raised by the electric actuator and the spring.

2. The hitch assembly of claim 1, further comprising a rockshaft that extends parallel with respect to a longitudinal length of the chassis; and a bracket fixed to the rockshaft, wherein the center link is pivotally attached to the bracket and rotatable with the rockshaft.

3. The hitch assembly of claim 2, further comprising a pair of lift arms spaced apart from each other on opposite sides of the center link and each fixed to the rockshaft at one end and pivotally attached to the electric actuator and the spring at the other end.

4. The hitch assembly of claim 3, further comprising and a pair of rocker arms spaced apart from each other on opposite sides of the center link and each fixed to the rockshaft; and a pair of lift rods each one of which being attached to a corresponding one of the pair of lower link arms at one end and to the corresponding one of the pair of rocker arms at the other end.

5. The hitch assembly of claim 1, wherein the electric actuator comprises of a housing and a rod that extends and retracts with respect to the housing, wherein the housing is pivotally mounted to the chassis and the rod is pivotally attached to one of the pair of lift arms.

6. The hitch assembly of claim 5, further comprising a pair of electric actuators each one of which pivotally attached to one of the corresponding pair of lift arms.

7. The hitch assembly of claim 6, further comprising a pair of springs each one of which attached to one of the corresponding pair of lift arms.

8. The hitch assembly of claim 7, wherein the pair of springs are each gas springs comprising a cylinder and a piston rod linearly extending and retracting with respect thereto.

9. The hitch assembly of claim 8, wherein the cylinder of each of the gas springs is pivotally mounted to the chassis at one end and the piston rod is pivotally mounted to one of the lift arms of the pair of lift arms at the other end.

10. The hitch assembly of claim 9, further comprising a pair of mounting brackets each one of which is fixed on an opposite side of the chassis, wherein the cylinder of each of the gas springs is pivotally mounted to one of the pair of mounting brackets, and wherein the housing of each of the electric actuators is pivotally mounted to one of the pair of mounting brackets.

11. The hitch assembly of claim 10, wherein a rotational axis of the housing of the electric actuator is above a rotational axis of the cylinder of the gas spring.

12. The hitch assembly of claim 1, wherein a rotational axis of a housing of the electric actuator is positioned rearward of the rotational axis of a cylinder of a gas spring.

13. The hitch assembly of claim 12, wherein the rotational axis of the housing of the electric actuator is positioned above a rotational axis of a link arm of the pair of link arms.

14. The hitch assembly of claim 13, wherein a vertical plane defined by the rotational axis of the housing of the electric actuator is forward with respect to a vertical plane defined by a rotational axis of a rockshaft.

15. The hitch assembly of claim 1, wherein the actuator is electrically connected to a battery unit combinable to the chassis for providing a DC voltage to the electric actuator.

16. The hitch assembly of claim 15, and further comprising a control unit in communication with the electric actuator to provide a control signal to the electric actuator.

17. The hitch assembly of claim 1, and further comprising a rockshaft on which the center link is combined, a lift arm combined to the rockshaft, wherein the electric actuator is combined between the chassis and the lift arm, a rocker arm combined to the rockshaft, and a lift rod combined between the rocker arm and a link arm of the pair of link arms.

18. A robotic vehicle comprising:
   a chassis;
   a battery unit combined to the chassis for supply a DC voltage source; and
   a hitch assembly combinable to the chassis for selectively receiving an implement, wherein the hitch assembly comprises:
   a pair of link arms combined to the chassis for selectively receiving the implement;
   a center link combined to the chassis and spaced vertically from the pair of link arms for selectively receiving the implement, wherein the pair of link arms and the center link form attachment points for the implement;
   a spring combined between the chassis and the pair of links arms; and
   an electric actuator combined between the chassis and the pair of links arms for compressing the spring with the assistance of gravity on a downward stroke of the electric actuator while lowering the pair of link arms to store potential energy in the spring and match the lifting power of an outward stroke of the electric actuator when the pair of link arms are raised by the electric actuator and the spring.

19. The robotic vehicle of claim 18, wherein the hitch assembly further comprises a rockshaft that extends parallel with respect to a longitudinal length of the chassis; and a bracket fixed to the rockshaft, wherein the center link is pivotally attached to the bracket and rotatable with the rockshaft; a pair of lift arms spaced apart from each other on opposite sides of the center link and each fixed to the rockshaft at one end and pivotally attached to the electric actuator and the spring at the other end; and a pair of rocker arms spaced apart from each other on opposite sides of the center link and each fixed to the rockshaft; and a pair of lift rods each one of which being attached to a corresponding one of the pair of lower link arms at one end and to the corresponding one of the pair of rocker arms at the other end.

20. The robotic vehicle of claim 18, wherein the electric actuator of the hitch assembly further comprises a housing and a rod that extends and retracts with respect to the housing, wherein the housing is pivotally mounted to the chassis and the rod is pivotally attached to one of the pair of link arms, wherein a cylinder of the spring is pivotally mounted to the chassis at one end and a piston rod of the spring is pivotally mounted to one of the link arms of the pair of link arms at the other end, wherein the hitch assembly further comprises a mounting bracket fixed to the chassis, wherein the cylinder of the spring is pivotally mounted to the mounting bracket, and wherein the housing of the electric actuator is pivotally mounted to the mounting bracket, and wherein a rotational axis of the housing of the electric actuator is above a rotational axis of the cylinder of the spring.

21. The robotic vehicle of claim 18, wherein the electric actuator is double acting to provide a positive downward force on the pair of link arms.

\* \* \* \* \*